United States Patent [19]

Ruckdeschel et al.

[11] 4,133,029
[45] Jan. 2, 1979

[54] DATA PROCESSING SYSTEM WITH TWO OR MORE SUBSYSTEMS HAVING COMBINATIONAL LOGIC UNITS FOR FORMING DATA PATHS BETWEEN PORTIONS OF THE SUBSYSTEMS

[75] Inventors: Hermann Ruckdeschel, Gauting; Thomas Rambold, Munich, both of Fed. Rep. of Germany

[73] Assignee: Siemens Aktiengesellschaft, Munich, Fed. Rep. of Germany

[21] Appl. No.: 678,621

[22] Filed: Apr. 20, 1976

[30] Foreign Application Priority Data

Apr. 21, 1975 [DE] Fed. Rep. of Germany ....... 2517553

[51] Int. Cl.² ........................... G06F 3/04; G06F 9/18; G06F 13/00
[52] U.S. Cl. .................................................. 364/200
[58] Field of Search ................... 340/172.5, 146.1 BE; 445/1; 235/153 AG, 156; 364/200 MS File, 900 MS File

[56] References Cited

U.S. PATENT DOCUMENTS

| 3,253,262 | 5/1966 | Wilenitz et al. | 340/172.5 |
|---|---|---|---|
| 3,503,048 | 3/1970 | Avsan et al. | 340/172.5 |
| 3,517,174 | 6/1970 | Ossfeldt | 235/153 AE |
| 3,676,861 | 7/1972 | Ruth | 340/172.5 |
| 3,678,467 | 7/1972 | Nussbaum et al. | 340/172.5 |
| 3,691,531 | 9/1972 | Saltini et al. | 340/172.5 |
| 3,739,345 | 6/1973 | Janssens et al. | 340/172.5 |
| 3,865,999 | 2/1975 | Spitaels | 340/172.5 X |
| 3,879,712 | 4/1975 | Edge et al. | 340/172.5 |
| 3,964,056 | 6/1976 | Charpentier et al. | 340/172.5 |

*Primary Examiner*—Melvin B. Chapnick
*Attorney, Agent, or Firm*—Schuyler, Birch, Swindler, McKie & Beckett

[57] ABSTRACT

A data processing system constituted by at least two subsystems, each having at least an integrated combinational logic unit comprising a storage and input/output gates and with which at least two control units are connected. The subsystems are constructed using integrated semiconductor techniques. Peripheral units are connected to the input/output gates. The data path between the control units, among one another or between one control unit and the peripheral units, is routed, respectively, over the storage or over the input-/output gates to which the relevant peripheral units are connected. The control unit supplies data signals which cause the aforementioned data path to be completed.

8 Claims, 2 Drawing Figures

DATA PROCESSING SYSTEM WITH TWO OR MORE SUBSYSTEMS HAVING COMBINATIONAL LOGIC UNITS FOR FORMING DATA PATHS BETWEEN PORTIONS OF THE SUBSYSTEMS

BACKGROUND OF THE INVENTION

This invention relates to data processing systems comprising two or more subsystems with which are associated two or more integrated combinational logic units having one storage each and input/output gates for peripheral units and with which two or more control units are associated.

Systems of the foregoing general type are well known in the art. (cf. Elektronik 1974, pp. 379-395, particularly p. 381 and pp. 393-394; West German Published Patent Application No. 1 956 225; West German Unexamined Patent Application No. 2 362 245). These data processing systems may, for example, be utilized for the control of telephone switching systems (cf. West German Unexamined Patent Application No. 2 364 082). The logic and control units associated with a data processing system, as well as other units, may be manufactured as monolithic integrated semiconductor structural units, more particularly by use of metal-oxide-silicon (MOS) techniques (cf. West German Unexamined Patent Applications Nos. 2 235 430, 2 336 333, 2 247 704).

A structural unit fabricated in the above described manner has, e.g., four input/output gates and associated devices for the evaluation of addresses for the gates (cf. Rockwell International Corporation MOS-LSI Parallel Processing System Programmers Reference Manual for Microprogramming, Rev. May 1973, pp. 2-13 to 2-17 and Data Sheet Parallel Processing System (PPS-4) Rev. 1, June 1974, pp. 2-1 and 8-1 to 8-3). Full details for the construction, utilization and operation of such structural units are known, as indicated by the above referenced publications.

A central processing unit is known which, in addition to input and output gate circuits, includes a data storage (cf. West German Unexamined Patent Application No. 2 136 210). However, among other things a combinational logic unit is also included in this fundamental central unit. This might be due to the fact that it is not a unit using integrated semiconductor design.

An object of this invention is to provide a data processing system having logic units for forming data paths between portions of a data processing system using integrated semiconductor designs.

A further object of the invention is to provide for the proper interaction in a data processing system between path-forming logic units constructed as integrated semiconductor structures and control units.

SUMMARY OF THE INVENTION

In accordance with the invention a data processing system is provided comprising two or more subsystems with which are associated two or more logic units in an integrated semiconductor structure having one storage each and having input/output gates for peripheral units and with which two or more control units are associated.

The data processing system of the invention is characterized in that the subsystems having no less than one logic unit and one associated control unit each, as well as the peripheral units thereof, may be interconnected over those input/output gates of the arithmetic logic units, to each of which an unassociated control unit is connected. The data path for useful data communication between the control units, among one another or between one control unit and the peripheral units, is routed over the relevant input/output gates to which these units are connected and over the storage of an integrated logic unit utilized in part as a buffer storage. A data path is caused to be connected by control data supplied by an involved control unit and through which in the logic unit being used the data path is routed over the buffer storage through operation of not less than one input/output gate.

Since storage and input/output gates are contained in the same logic unit, these input/output gates may at the same time be used for interconnection with other structural units and for inserting the buffer storage in the data path established at a particular time. The buffer storage can then compensate different operating units by means of its buffering capability. Moreover, this enables data to be interchanged between two control units in a fully uncoordinated manner. To achieve this, it is advantageous that the data path between control units has one specified direction of transmission and is supplemented by a data path for the reverse direction which is routed over another logic unit and associated buffer storage. In this case, one control unit may, if necessary, temporarily file data for the other control unit in the buffer storage of an integrated logic unit. The filed data may be retrieved by the other control unit while it interrogates the buffer storage independently of the program run of the control unit that has supplied the data. The buffer storage of an integrated logic unit may, from case to case, also be used as a data storage for a permanently allocated control unit. Thus, it becomes apparent that the data processing system constructed in accordance with the teachings of the invention has great operational versatility and that the integrated, path-forming logic units may be utilized in a variety of ways.

The input/output gates of a given logic unit have an output bistable circuit and an input amplifier which are connected to electronic couplers (cf. West German Published Patent Application No. 2 409 751) which may be controlled by control data, whereby the input or output function may be defined. Thus, the function of the input/output gates is not fixedly established by circuit design, but may be adjusted in accordance with the specific system application. Therefore, both a structural unit supplying data and one receiving data, more particularly a peripheral unit, may be connected to an input/output gate. The subunits associated with an input/output gate may be so constructed that they can transfer useful data consisting of several binary data to be transferred in parallel.

BRIEF DESCRIPTION OF THE DRAWINGS

The principles of the invention will be more readily understood by reference to a description of a preferred embodiment, constructed accordingly, given below and illustrated in the drawings which are briefly described as follows.

DETAILED DESCRIPTION OF THE PREFERRED EMBODIMENT

The data processing system constructed according to the invention and comprising two or more subsystems and the embodiments thereof will be described hereinbelow with reference to FIGS. 1 and 2.

Figure 1:
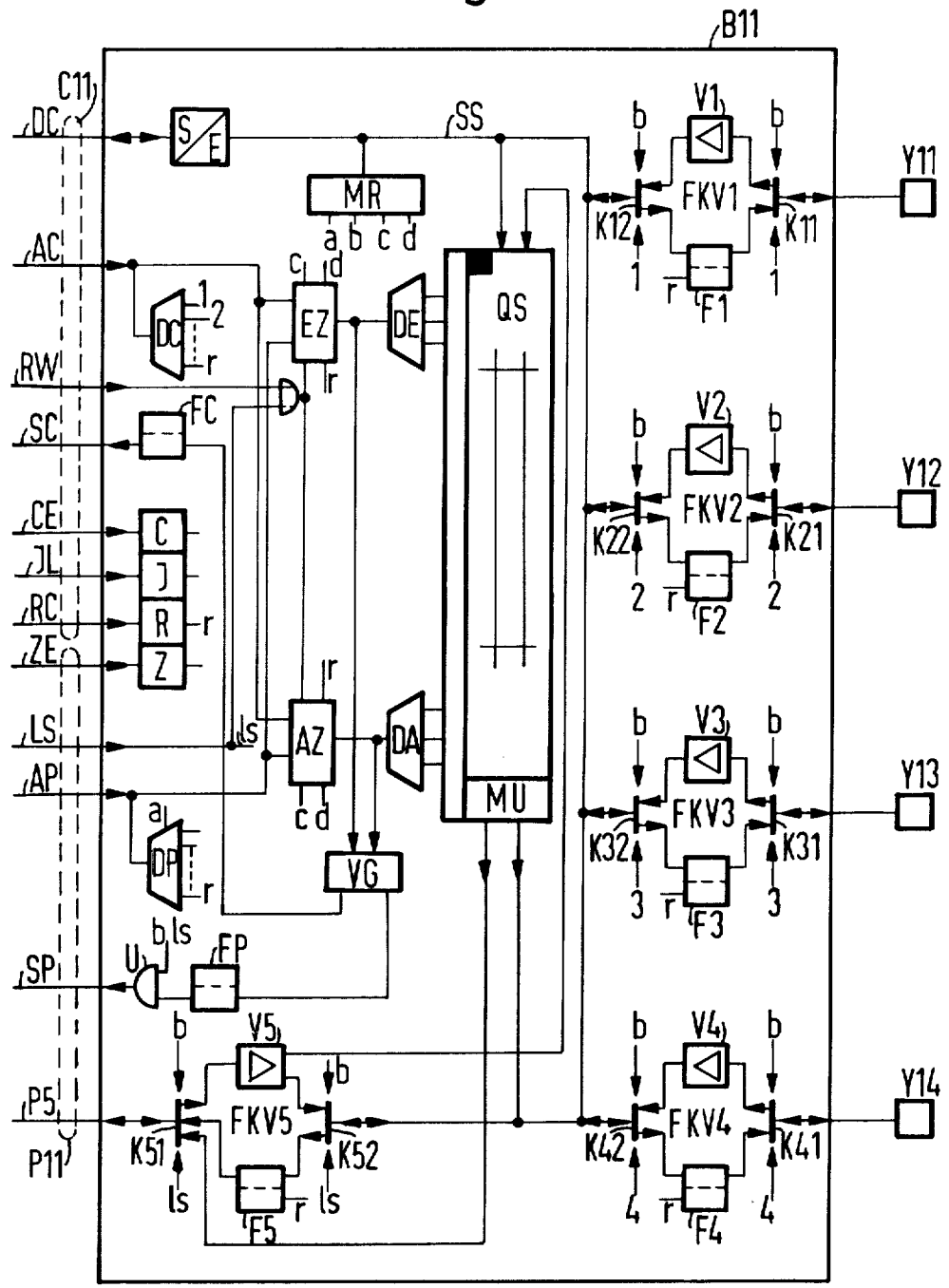
FIG. 1 is a schematic diagram of an integrated, path-forming logic unit in accordance with the invention
Figure 2:
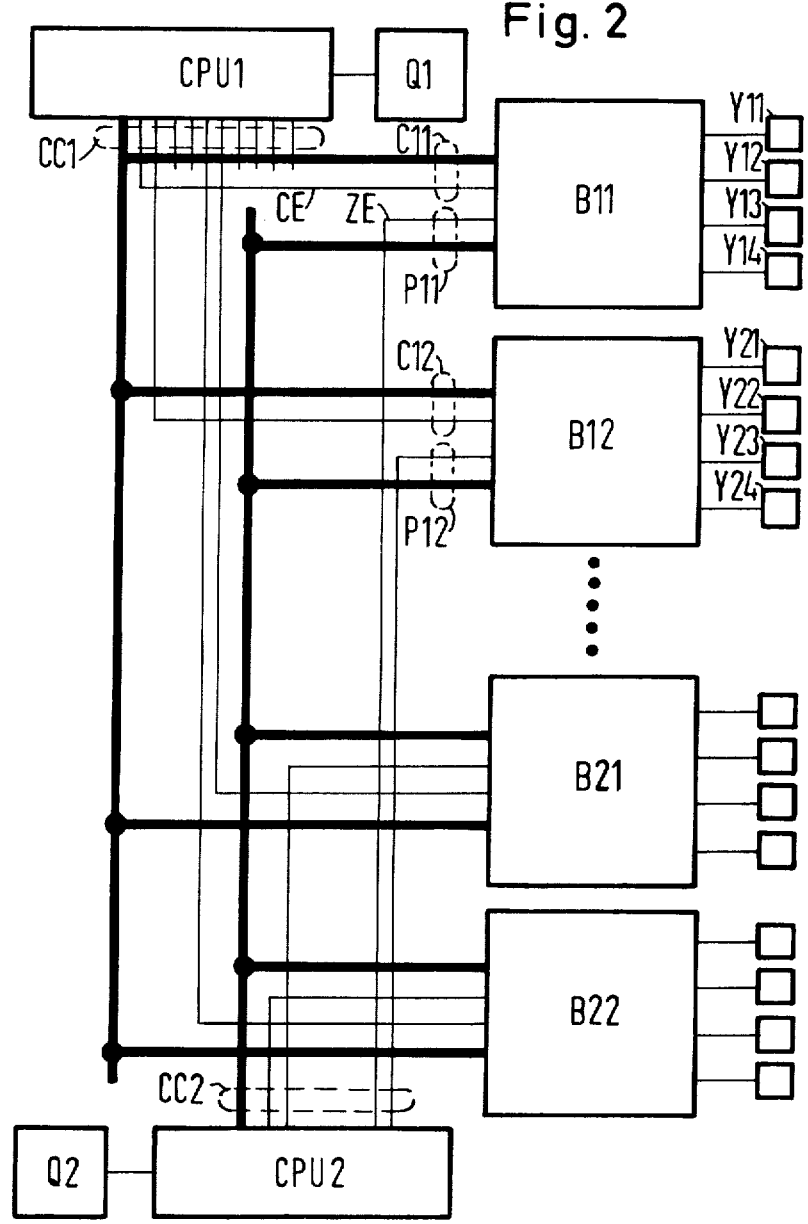
FIG. 2 is a block-schematic diagram of a system having at least two logic units, as illustrated in FIG. 1, interconnected with at least two control units by means of busbars.

The data processing system of FIG. 2 includes path-forming logic units B11, B12 . . . B21 and B22. The subunits associated, for example, with a given logic unit are illustrated in FIG. 1. Accordingly, the logic unit shown therein has, among other things, as subunits input/output gates FKV1 . . . FKV5 and a buffer storage QS. Peripheral units Y11 . . . Y14 are connected, respectively, to input/output gates FKV1 . . . FKV4. To input/output gate FKV5 is connected a trunk P5 associated with the trunk P5 connected to the trunk group CC2 which, in turn, runs to control unit CPU2 (cf. FIG. 2).

In logic unit B11, input/output gates FKV1 . . . FKV5 are connected to the busbar SS coupled to trunk DC over bidirectional amplifier S/E. Trunk DC, in turn, is associated with trunk group C11, which is connected to the trunk group CC1 connected to control unit CPU1 (cf. FIG. 2). In this way logic unit B11 and control unit CPU1 are allocated to each other. Similarly, logic unit B12 and control unit CPU1 are allocated to each other. As shown in FIG. 2, control unit CPU2 and arithmetic logic units B21 and B22 are likewise allocated to each other. The inputs and outputs of buffer storage QS are connected to the busbar SS mentioned hereinabove and shown in FIG. 1. Thus, the buffer storage may receive data conducted by bushbar SS and emit them thereto.

The mutual allocation of the control units of FIG. 2 and the logic units produces the two subsystems associated with the data processing system depicted therein. Read-only memory Q1 is connected to control unit CPU1 of one subsystem, and read-only memory Q2 is connected to control unit CPU2 of the other subsystem. In particular, the read-only memories contain the program instructions to be used. Each of the logic units of both subsystems is connected to the two trunk groups CC1 and CC2 coupled to control units CPU1 and CPU2, as described hereinabove for logic unit B11. Accordingly, logic unit B12 is connected by its trunk groups C12 and P12. Moreover, peripheral units are connected to all logic units. In the case of combination unit B12 these are the peripheral units Y21 . . . Y24.

The subsystem having the control unit CPU1 may be interconnected with control unit CPU2, e.g., by input-/output gate FKV5 of logic unit B11. This produces a data path running from control unit CPU1 and trunk group CC1 to trunk group C11 of logic unit B11, and from trunk DC thereof, over busbar SS in unit B11 to input/output gate FKV5, and from there over trunk P5 of trunk group P11 to trunk group CC2 of control unit CPU2. Appropriate data paths may also be connected by using logic units B12 . . . B22 in the same manner. In the data path between the control units, among themselves or between one control unit and peripheral units, the data path running over the relevant input/output gates to which said units are connected, storage QS of the arithmetic logic units being used may be inserted. The storage is connected to the busbar associated with the logic unit in the manner described hereinabove. Useful data for subsequent processing are transferred over such a data path. The control data needed for the data path detailed hereinabove, which in the example proceeds through logic unit B11, are supplied, for example, from control unit CPU1. Thus, when input/output gate FKV5 is operated, the data path may be routed over buffer storage QS.

Each of the input/output gates has an output bistable circuit and an input amplifier. Thus, input/output gate FKV5 has output bistable circuit F5 and input amplifier V5. The electronic couplers K51 and K52 are controlled at input/output gate FKV5. To convey useful data arriving at logic unit B11 over trunk P5 of trunk group P11, electronic coupler K51 is controlled in such a manner that the data are transferred to input amplifier V5. The input amplifier has an output connected directly to buffer storage QS, so that the incoming data may be received by the buffer storage. When the data are emitted from buffer storage QS, they are coupled to busbar SS of unit B11, and from there, through bidirectional amplifier S/E to trunk DC of trunk group C11. Useful data arriving in a reverse direction of transmission over trunk DC and bidirectional amplifier S/E also are carried by busbar SS to buffer storage QS and may be received by the latter. They may be emitted over a separate trunk leading to electronic coupler K51 and transferred over said electronic coupler to trunk P5. Output register MU of buffer storage QS is designed as a mutliplexer and may, therefore, deliver the data to be transferred optionally over one of two continuing data paths. One such data path runs over busbar SS of arithmetic logic unit B11 and the other data path over electronic coupler K51.

A data path, caused to be connected by control data, may also connect a peripheral unit. Thus, for example, a data path for useful data may run from control unit CPU1 in the manner described hereinabove to busbar SS of unit B11, and thus, to buffer storage QS. It may then continue over output register MU, for example, over busbar SS, to peripheral unit Y11, for which electronic couplers K11 and K12 of input/output gate FKV1 must appropriately be controlled in the known manner by control data. Through appropriate control of the electronic couplers the data path may be routed for an input function over input amplifier V1 or for an output function over output bistable circuit F1. Through appropriate operation of input/output gates other data paths may also be connected.

The data path described hereinabove between control units CPU2 and CPU1 and having a direction of transmission from control unit CPU2 to control unit CPU1 may be supplemented by a data path for the reverse direction routed over unit B12 and the associated buffer storage. Accordingly, the latter data path runs from control unit CPU1 over its trunk group CC1 and trunk group C12 of unit B12, over its buffer storage and its trunk group P12 of control unit CPU2. If each of the buffer storages of the path-forming logic units has two or more memory locations, the useful data fed consecutively may be accepted by them one at a time, and thereafter, emitted consecutively one at a time. The useful data to be transferred in both directions of transmission cannot falsify each other since they have separate data paths. Even if only one direction of transmission is utilized, the presence of two or more memory locations has its beneficial effects, since the useful data may then be transferred one at a time during available operating interruptions of the control units.

FIG. 1 shows for path-forming logic unit B11 examples for the subunits that achieve the operation of buffer storage QS in the manner provided. For this purpose, buffer storage QS is equipped with input counter EZ and output counter AZ. Each counter serves as an address generator for addresses of memory locations, with the input counter EZ determining the location accepting the useful data and the output counter AZ the location emitting the same (cf. West German Unexamined Patent Application No. 2 002 369). The address decoders DE and DA serve for the decoding in the conventional manner of the addresses of memory locations supplied by the counters. Counters EZ and AZ may be switched over via their inputs d for modifying their counting modes, so that during a hookup of two units of the data processing system either only useful data for a location are accepted or emitted, or a useful block of data requiring two or more locations is accepted or emitted. Accordingly, when a useful block of data is accepted, the input counter is advanced two or more counter positions in succession, the addresses of memory locations are decoded one after another, and the useful data waiting to be served are fed to the associated memory locations. This is performed until all data pertaining to the block of useful data are accepted consecutively in two or more locations during the same hookup of, e.g., two control units. Similarly, useful data pertaining to the block of useful data are emitted during the same hookup of the control units. The end of a block of useful data may, for example, be established by a predetermined combination of data elements in the block of useful data. The combination of data elements may also be utilized for the adjustment of the counting mode of counters EZ and AZ over a special interpreter circuit.

Also connected to the counter outputs is comparator VG, which compares the counter adjustments and indicates, as comparison result, the busy/idle status of the memory locations of buffer storage QS to connected control units CPU1 and CPU2. Such indications are retransmitted over indicator bistable circuits FC and FP. From the indicator bistable circuit FC they are retransmitted via trunk SC of trunk group C11 to control unit CPU1. From indicator bistable circuit FP they can be retransmitted via trunk SP of trunk group P11 to control unit CPU2. They are transmitted thereto via trunk group CC2. However, logic units B21 and B22 of the subsystem with control unit CPU2 are likewise connected to the trunk group. To prevent overlapping of indications originating in various logic units, they may be requested one at a time for which, e.g., AND element U must be triggered. It should be noted that both the indicator bistable circuits FP and FC and the AND element U may be so constructed that they can accept in parallel and retransmit two or more binary data. The indication of the busy/idle condition of the memory locations of the buffer storage of an logic unit is taken into consideration during the retrieval and supply of useful data through the control unit being used. In this way, data items, for example, are prevented from being fed to a fully used buffer storage, which cannot accept them. In the operating mode described hereinabove, the useful data item stored first is the next item to be retrieved.

The fact that an logic unit has a storage that may be utilized as a buffer storage enables the data processing system to offer new service features. One of these service features involves the use of buffer storage QS of logic unit B11 from case to case as a push-down or stacking storage for a control unit, more particularly for the associated control unit CPU1. As is known, a push-down storage consists of a series of similar memory locations, of which only one at a time is called up. In the case of data input the contents of a memory location in a push-down storage are transferred to the adjacent location, and the data item to be stored is written to the location being released. In the case of data output the contents of a memory location are read and the contents of the other locations transferred to those being vacated. Hence, again the data item stored first is the next item to be retrieved. If the buffer storage is a push-down storage for the associated control unit, it may participate in the program operation in the control unit and, for example, temporarily accept branch addresses for the operation of subprograms. The operation as a push-down storage is achieved with the aid of counters EZ and AZ.

Buffer storage QS of logic unit B11 may from case to case be used as a buffer for data processing results of a control unit, more particularly of the associated control unit CPU1. In order that its memory locations may be used selectively, counters EZ and AZ are switched over via their control terminals c in such a way that they accept as address registers addresses of memory locations supplied by the control unit being used. In this way, any of the memory locations may be called up for the acceptance of a data item or emission via the multiplexer MU. The use of the buffer storage of an logic unit by the associated control unit is particularly convenient if no, or very few, peripheral units are connected to the unit and if, for example, no other control unit is connected.

An integrated, path-forming logic unit equipped with a buffer storage may also be utilized for different operating modes. The modes are particularly distinguished by the different modes of the buffer storage. In order to be able to switch the logic unit B11 over to one of the different modes using control data, it is equipped with operating register MR which stores control data supplied by the associated control unit. In unit B11 the operating register MR is connected to busbar SS. The data item accepted in each case affects one of its control terminals a, b, c, d and the similarly marked control terminals of other subunits in logic unit B11 connected thereto. Via control terminals d, for example, the selection for operation with blocks of useful data is accomplished. Via control terminals c, for example, operation with acceptance and transfer of individual data items is selected. Via control terminals b, for example, indicating data of comparator VG via the AND element U is selected. Furthermore, the data contained in bistable output circuits F1 . . . F5 may be transferred. Via control terminals a the buffer storages are used for the interoperation with the associated control unit and blocks the acceptance of data from other data sources. If necessary, the control data utilized therefor are transferred to other subunits of unit B11 participating in the operating modes concerned.

Logic unit B11 must be supplied not only control data for the switchover to different modes but also control data through which the subunits to be utilized in a mode already established (e.g., input/output gates) can be actuated. Decoders DC and DP are provided in arithmetic logic unit B11 for accepting, decoding and transferring such control data. Control data are fed to decoder DC from associated control unit CPU1 over trunk AC associated with trunk group C11. Control data from control unit CPU2 are fed to decoder DP over trunk AP associated with trunk group P11. Moreover, addresses of memory locations are fed directly to counters EZ and AZ over the two trunks. Decoders DC and DP have control terminals to which similarly marked control terminals of other subunits, e.g., electronic couplers of input/output gates FKV1... FKV4, are connected. Thus, for example, electronic couplers K11, K12, K21, K22, K31, K32 and K41, K42 may be controlled over control terminals 1, 2 ... of decoder DC.

In the interest of clarity, not all control possibilities suitable for use through the control terminals are indicated in detail. However, the figure shows also that control data may be transferred over decoders DC and DP for resetting subunits such as bistable circuits F1 .. . F5 of input/output gates FKV1 ... FKV5 and of counters EZ and AZ for buffer storage QS. The control terminals for this purpose are the control terminals r of the decoders connected to the similarly marked control terminals r of the other units involved. In addition, the other units may be reset over special reset input RC of input circuit R. Resetting of the subunits involved may thus be achieved by program from control unit CPU1 or CPU2 or via special reset input RC.

Furthermore, logic unit B11 has terminals over which certain control data may be fed. Thus, their utilization may be initiated by control unit CPU1 over trunk CE and connecting equipment C. The utilization by control unit CPU2 may likewise be initiated over trunk ZE and connecting equipment Z. The arithmetic logic unit is utilized by turning on the supply voltages over trunk JC and over connecting equipment J connected thereto. This ensures the proper application of the supply voltages to the various subunits (cf. West German Patent Application No. P 24 60 671.1). Control unit CPU2 may send control data to counters EZ and AZ over trunk LS of trunk group P11, the utilization of buffer storage QS for the acceptance or emission of useful data being controlled by said counters EZ and AZ. The direction in which the data items in the buffer storage, when used as a push-down storage, are transferred from location to location may likewise be established, whereby the direction of counting of counters EZ and AZ may also be reversed. The appropriate control data may be fed from associated control unit CPU1 over trunk RW over trunk group C11. In connection with the acceptance or emission of data, electronic couplers K51 and K52 and AND element U are controlled in the appropriate manner over trunk LS, as indicated by the reference symbol ls.

The principles of the invention are described hereinabove by describing a preferred embodiment of them. The described embodiment is to be considered only as being exemplary, and it is contemplated that it can be modified or changed in a variety of ways known to those skilled in the art while remaining within the scope of the invention as defined by the appended claims.

We claim:

1. A data processing system formed into subsystems, comprising:
    a plurality of peripheral units,
    at least two control units, each of which is assigned to a given one of said subsystems,
    a plurality of integrated logic units, each of which is assigned to a given one of said control units, each said logic unit comprising a buffer store, a plurality of input-output gates and means for connecting the said assigned control unit to the integrated logic unit, said input-output gates being operable, respectively, to connect ones of said peripheral units and the one of said control units to which the logic unit is not assigned to that logic unit, said buffer store having inputs and outputs connectable, respectively, to said input-output gates and said means for connecting and
    means responsive to control data from a said control unit for operating said input-output gates in a said integrated logic unit to participate in a data transfer in order to establish a data path for the data transfer via at least one of said input-output gates and via said buffer store, whereby data can be transferred via each said integrated logic unit between said control units or between a said control unit and a peripheral unit associated with a given integrated logic unit.

2. The data processing system defined in claim 1 wherein each said subsystem comprises at least two integrated logic units and wherein said data path is unidirectional, a corresponding data path in the opposite direction being formed through a second said integrated logic unit.

3. The data processing system defined in claim 1 wherein said buffer store comprises at least two storage locations which receive data coupled thereto one location at a time and sequentially and emit data one at a time and sequentially.

4. A data processing system defined in claim 1 wherein said buffer store comprises:
    an input counter for generating addresses of locations in said buffer store for accepting data being processed,
    an output counter for generating addresses of locations in said buffer store for emitting data to be processed,
    said input and output counters comprising, respectively, switching means for changing the counting modes so that for a given operation either only data are received or emitted from said buffer store and
    comparator means connected to output terminals of said input and output counters for comparing the counting modes and for indicating the compared result to said control units thereby indicating the state of occupation of the various storage locations.

5. The data processing system defined in claim 1 wherein each said input/output gate comprises:
    an output bistable circuit for emitting data signals,
    an input amplifier for receiving data signals and
    an electronic coupler for switching between input and output states under the control of control data from a said control unit.

6. The data processing system defined in claim 1 wherein said buffer store is constructed to function as a push-down storage for said control unit.

7. The data processing system defined in claim 4 wherein said buffer store is connected to function as a buffer storage for said control unit, said input and output counters being switched to function as address registers for storage locations supplied by said control unit.

8. The data processing system defined by claim 4 further comprising:
    an operating register for storing control data supplied by said control unit for the switching of said input and output counters to change the operating modes thereof and for emitting the control data to other components of the integrated logic unit as needed for performing a specific operation.

* * * * *